(12) United States Patent
Kim et al.

(10) Patent No.: US 9,614,786 B2
(45) Date of Patent: Apr. 4, 2017

(54) DRAGONFLY PROCESSOR INTERCONNECT NETWORK

(71) Applicants: Intel Corporation, Santa Clara, CA (US); The Board of Trustees of the Leland Stanford Junior University, Palo Alto, CA (US)

(72) Inventors: John Kim, Seattle, WA (US); Dennis C. Abts, Chippewa Falls, WI (US); Steven L. Scott, Chippewa Falls, WI (US); William J. Dally, Palo Alto, CA (US)

(73) Assignees: Intel Corporation, Santa Clara, CA (US); The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 14/583,588

(22) Filed: Dec. 27, 2014

(65) Prior Publication Data

US 2015/0186318 A1    Jul. 2, 2015

Related U.S. Application Data

(63) Continuation of application No. 12/195,198, filed on Aug. 20, 2008.

(51) Int. Cl.
*G06F 13/42* (2006.01)
*H04L 12/933* (2013.01)
(Continued)

(52) U.S. Cl.
CPC .......... *H04L 49/15* (2013.01); *G06F 9/45533* (2013.01); *G06F 13/4027* (2013.01);
(Continued)

(58) Field of Classification Search
CPC ............. G06F 13/4221; G06F 13/4027; G06F 9/45533; G06F 15/17375; H04L 45/28; H04L 45/58
See application file for complete search history.

(56) References Cited

U.S. PATENT DOCUMENTS 4,970,658 A  11/1990  Durbin et al.
5,079,738 A  1/1992  Bockenfeld
(Continued)

FOREIGN PATENT DOCUMENTS

EP  2451127  5/2012
EP  2461254  6/2012
(Continued)

OTHER PUBLICATIONS

Scott et al. (The blackwidow high-radix clos network. ISCA'06, 2006, 12 pages).*
(Continued)

*Primary Examiner* — Oleg Korsak
(74) *Attorney, Agent, or Firm* — Patent Capital Group

(57) ABSTRACT

A multiprocessor computer system comprises a dragonfly processor interconnect network that comprises a plurality of processor nodes, a plurality of routers, each router directly coupled to a plurality of terminal nodes, the routers coupled to one another and arranged into a group, and a plurality of groups of routers, such that each group is connected to each other group via at least one direct connection.

29 Claims, 6 Drawing Sheets

(51) Int. Cl.

| | | |
|---|---|---|
| *H04L 12/931* | (2013.01) | |
| *G06F 15/173* | (2006.01) | |
| *H04L 12/775* | (2013.01) | |
| *G06F 9/455* | (2006.01) | |
| *G06F 13/40* | (2006.01) | |
| *H04L 12/703* | (2013.01) | |

(52) U.S. Cl.
CPC .... *G06F 13/4221* (2013.01); *G06F 15/17375* (2013.01); *H04L 45/58* (2013.01); *H04L 49/70* (2013.01); *H04L 45/28* (2013.01); *H04L 49/1515* (2013.01)

(56) References Cited

U.S. PATENT DOCUMENTS

| | | |
|---|---|---|
| 5,249,283 A | 9/1993 | Boland |
| 5,425,029 A | 6/1995 | Hluchyj et al. |
| 5,864,738 A | 1/1999 | Kessler et al. |
| 5,881,135 A | 3/1999 | Watts et al. |
| 6,643,764 B1 | 11/2003 | Thorson et al. |
| 6,766,424 B1 | 7/2004 | Wilson |
| 7,139,926 B1 | 11/2006 | Madhav et al. |
| 7,409,506 B2 | 8/2008 | Kamigata et al. |
| 7,675,857 B1 | 3/2010 | Chesson |
| 8,018,860 B1 | 9/2011 | Cook |
| 8,260,922 B1 | 9/2012 | Aggarwal et al. |
| 8,495,194 B1 | 7/2013 | Brar et al. |
| 8,576,715 B2 | 11/2013 | Bloch et al. |
| 9,137,143 B2 | 9/2015 | Parker et al. |
| 2002/0124134 A1 | 9/2002 | Chilton |
| 2002/0131362 A1 | 9/2002 | Callon |
| 2003/0088696 A1 | 5/2003 | McCanne |
| 2005/0073958 A1 | 4/2005 | Atlas et al. |
| 2005/0177344 A1 | 8/2005 | Khaleel |
| 2005/0289101 A1 | 12/2005 | Jayasimha et al. |
| 2007/0198675 A1 | 8/2007 | Amanuddin et al. |
| 2008/0025208 A1 | 1/2008 | Chan |
| 2008/0123679 A1 | 5/2008 | Scott et al. |
| 2008/0285562 A1 | 11/2008 | Scott et al. |
| 2009/0106529 A1 | 4/2009 | Abts et al. |
| 2010/0049942 A1 | 2/2010 | Kim et al. |
| 2010/0103813 A1 | 4/2010 | Allan et al. |
| 2010/0228798 A1 | 9/2010 | Kodama et al. |
| 2011/0153942 A1 | 6/2011 | Jain et al. |
| 2011/0191088 A1 | 8/2011 | Hsu et al. |
| 2012/0020349 A1 | 1/2012 | Dunwoody et al. |
| 2012/0059938 A1 | 3/2012 | Albing et al. |
| 2012/0072614 A1 | 3/2012 | Marr et al. |
| 2012/0144064 A1 | 6/2012 | Parker et al. |
| 2015/0188817 A1 | 7/2015 | Parker et al. |
| 2015/0208145 A1 | 7/2015 | Parker et al. |

FOREIGN PATENT DOCUMENTS

| | | |
|---|---|---|
| JP | H10285214 | 10/1998 |
| JP | 2000-201182 | 7/2000 |
| JP | 2006-012112 | 1/2006 |
| JP | 2012-105265 | 5/2012 |
| JP | 2012-105266 | 5/2012 |

OTHER PUBLICATIONS

Kim et al. (Flattened Butterfly : A Cost-Efficient Topology for High-Radix Networks, ISCA'07, Jun. 9-13, 2007, 12 pages).*

Kim, John et al.: "Technology-Driven, Highly-Scalable Dragonfly Topology", International Symposium on Computer Architecture, 2008. ISCA '08. 35th International Symposium on Architecturei, IEEE Piscataway, NJ, Jun. 21, 2008 ( pp. 77-88).

Gratz, Paul et al., "Regional congestion awareness for load balance in networks-on-chip", High Performance Computer Architecture, 2008. HPCA 2008. IEEE 14th International Symposium on, IEEE, Piscataway, NJ, USA, Feb. 16, 2008 (pp. 203-214.).

Valinataj, Motjaba et al., "A Fault-Tolerant and Congestion-Aware Routing Algorithm for Networks-on-Chip", Design and Diagnostics of Electronic Circuits and Systems (DDECS), 2010 IEEE 13th International Symposium on, IEEE, Piscataway, NJ, USA, Apr. 14, 2010, (pp. 139-144).

Varadarajan, Srinidhi et al, "Reinforcing reachable routes", Computer Networks 43 (2003), Elsevier Science Publishers, Amsterdam, NL, vol. 43, No. 3; Oct. 22, 2003 pp. 389-416 (28 pages).

Kim et al., "Cost-Efficient Dragonfly Topology for Large-Scale Systems", IEEE Micro (Impact Factor: 1.81). Mar. 2009; 29:33-40. DOI: 10.1109/MM.2009.5 (3 pages).

Arimilli et al., "The PERCS High-Performance Interconnect," 2010 18th IEEE Symposium on High Performance Interconnects (2010) (8 pages).

European Patent Office Extended Search Report and Opinion in EP Application Serial No. 11187952.4 mailed on Feb. 28, 2012.

European Patent Office Communication Pursuant to Article 94(3) EPC in EP Application Serial No. 11187952.4 mailed on Jul. 23, 2013.

European Patent Office Search Report and Opinion in EP Application Serial No. 11187953.2 mailed on May 7, 2012.

Japan Patent Office Notification of Reasons for Rejection in Japanese Patent Application Serial No. 2011-241239 mailed on Aug. 11, 2015.

FOLDOC Computing Dictionary: "router," Retrieved and printed on Oct. 3, 2015 from http://foldoc.org/router.

Japan Patent Office Action in Japanese Patent Application Serial No. 2011-241240 mailed on Aug. 18, 2015.

Japan Patent Office Action in Japanese Patent Application Serial No. 2015-012380 mailed on Dec. 1, 2015.

Japan Patent Office Action in Japanese Patent Application Serial No. 2015-103217 mailed on Mar. 22, 2016.

Japan Patent Office Action in Japanese Patent Application Serial No. 2015-103217 mailed on Aug. 2, 2016.

* cited by examiner

DRAGONFLY PROCESSOR INTERCONNECT NETWORK

CROSS REFERENCE TO RELATED APPLICATIONS

This application is a continuation (and claims the benefit of priority under 35 U.S.C. §120) of U.S. application Ser. No. 12/195,198, filed Aug. 20, 2008 and entitled DRAGONFLY PROCESSOR INTERCONNECT NETWORK. The disclosure of the prior application is considered part of and is incorporated by reference in the disclosure of this application.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

FIELD OF THE INVENTION

The invention relates generally to computer interconnect networks, and more specifically in one embodiment to a dragonfly topology processor interconnect network.

BACKGROUND

Computer systems have long relied on network connections to transfer data, whether from one computer system to another computer system, one computer component to another computer component, or from one processor to another processor in the same computer. Most computer networks link multiple computerized elements to one another, and include various functions such as verification that a message sent over the network arrived at the intended recipient, confirmation of the integrity of the message, and a method of routing a message to the intended recipient on the network.

Processor interconnect networks are used in multiprocessor computer systems to transfer data from one processor to another, or from one group of processors to another group. The number of interconnection links can be very large with computer systems having hundreds or thousands of processors, and system performance can vary significantly based on the efficiency of the processor interconnect network. The number of connections, number of intermediate nodes between a sending and receiving processing node, and the speed or type of connection all play a factor in the interconnect network performance.

Similarly, the network topology, or pattern of connections used to tie processing nodes together affects performance, and remains an area of active research. It is impractical to directly link each node to each other node in systems having many tens of processors, and all but impossible as the number of processors reaches the thousands.

Further, the cost of communications interfaces, cables, and other factors can add significantly to the cost of poorly designed or inefficient processor interconnect networks, especially where long connections or high-speed fiber optic links are required. A processor interconnect network designer is thereby challenged to provide fast and efficient communication between the various processing nodes, while controlling the number of overall links, and the cost and complexity of the processor interconnect network.

The topology of a network, or the method used to determine how to link a processing node to other nodes in a multiprocessor computer system, is therefore an area of interest.

SUMMARY

The invention comprises in one example a dragonfly topology network, comprising a plurality of processor nodes, a plurality of routers, each router directly coupled to a plurality of terminal nodes, the routers coupled to one another and arranged into a group, and a plurality of groups of routers, such that each group is connected to each other group via at least one direct connection.

Network data is routed in some embodiments using at least one of credit round-trip latency as an indicator of channel congestion and selective virtual channel discrimination.

DETAILED DESCRIPTION

Figure 1:
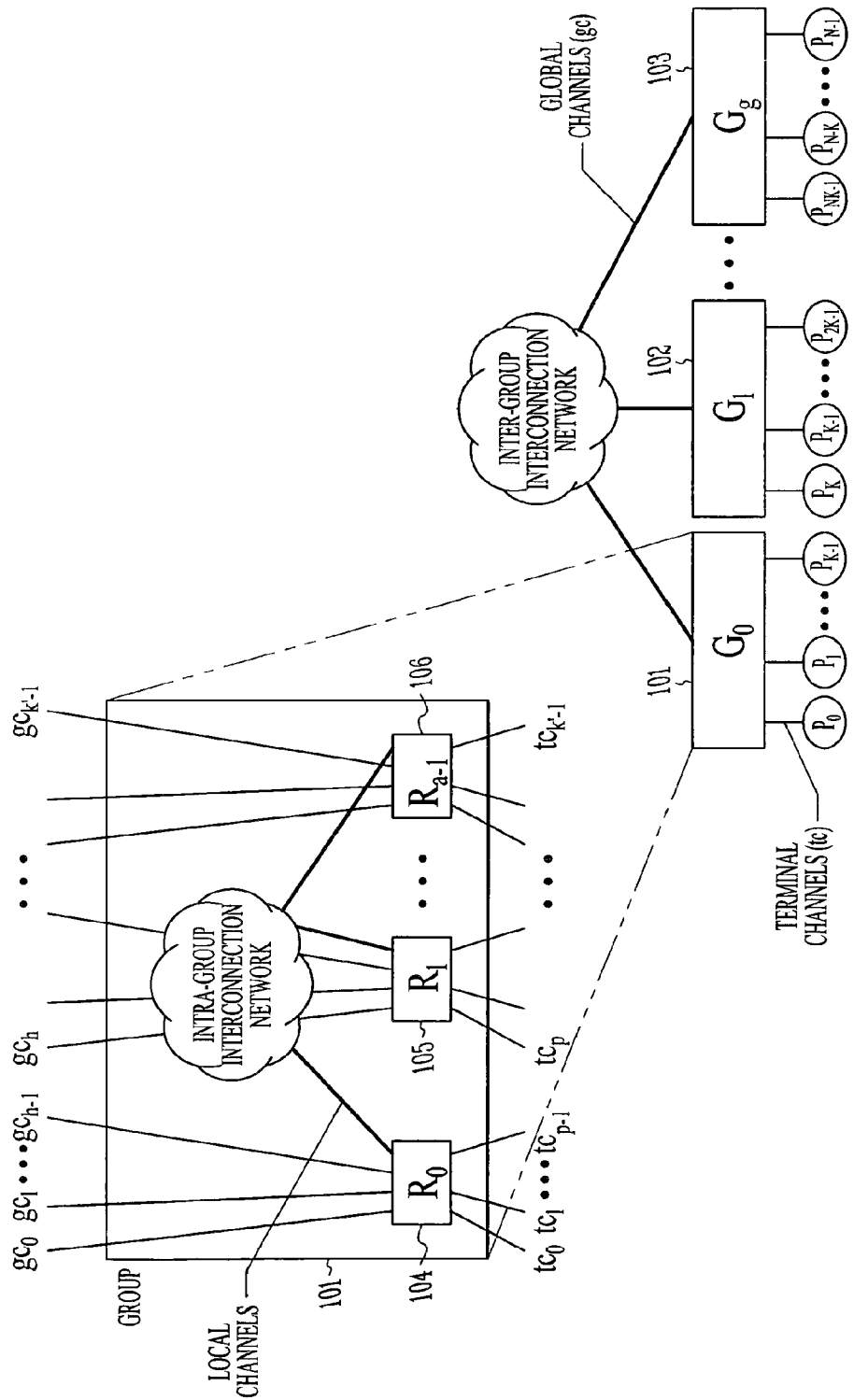
FIG. 1 is a block diagram of a dragonfly network topology, consistent with an example embodiment of the invention.

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Interconnection networks are widely used to connect processors and memories in multiprocessors, as switching fabrics for high-end routers and switches, and for connecting I/O devices. As processor and memory performance continues to increase in a multiprocessor computer system, the performance of the interconnection network plays a central role in determining the overall performance of the system. The latency and bandwidth of the network largely establish the remote memory access latency and bandwidth.

A good interconnection network typically designed around the capabilities and constraints of available technology. Increasing router pin bandwidth, for example, has motivated the use of high-radix routers in which increased bandwidth is used to increase the number of ports per router, rather than maintaining a small number of ports and increasing the bandwidth per port. The Cray Black Widow system, one of the first systems to employ a high-radix network, uses a variant of the folded-Clos topology and radix-64 routers—a significant departure from previous low-radix 3-D torus networks. Recently, the advent of economical optical signaling enables topologies with long channels. However, these long optical channels remain significantly more expensive than short electrical channels. In this paper, we introduce a Dragonfly topology, that exploits emerging optical signaling technology by grouping routers to further increase the effective radix of the network.

The topology of an interconnection network largely determines both the performance and the cost of the network. Network cost is dominated by the cost of channels, and in particular the cost of the long, global, inter-cabinet channels. Thus, reducing the number of global channels can significantly reduce the cost of the network. To reduce global channels without reducing performance, the number of global channels traversed by the average packet must be reduced. The dragonfly topology introduced in this paper reduces the number of global channels traversed per packet using minimal routing to one.

To achieve this global diameter of one, very high-radix routers, with a radix of approximately $2\sqrt{N}$ (where N is the size of the network) are used. While radix 64 routers have been introduced, and a radix of 128 is feasible, much higher radices in the hundreds or thousands are needed to build machines that scale to 8K-1M nodes if each packet is limited to only one global hop using traditional very high radix router technology. To achieve the benefits of a very high radix with routers without requiring hundreds or thousands of ports per node, the Dragonfly network topology proposes using a group of routers connected into a subnetwork as one very high radix virtual router. This very high effective radix in turn allows us to build a network in which all minimal routes traverse at most one global channel. It also increases the physical length of the global channels, exploiting the capabilities of emerging optical signaling technology.

Achieving good performance on a wide range of traffic patterns on a dragonfly topology involves selecting a routing algorithm that can effectively balance load across the global channels. Global adaptive routing (UGAL) can perform such load balancing if the load of the global channels is available at the source router, where the routing decision is made. With the Dragonfly topology, however, the source router is most often not connected to the global channel in question. Hence, the adaptive routing decision is made based on remote or indirect information.

The indirect nature of this decision leads to degradation in both latency and throughput when conventional UGAL (which uses local queue occupancy to make routing decisions) is used. We propose two modifications to the UGAL routing algorithm for the Dragonfly network topology that overcome this limitation with performance results approaching an ideal implementation using global information. Adding selective virtual-channel discrimination to UGAL (UGAL-VC H) eliminates bandwidth degradation due to local channel sharing between minimal and non-minimal paths. Using credit-round trip latency to both sense global channel congestion and to propagate this congestion information upstream (UGAL-CR) eliminates latency degradation by providing much stiffer backpressure than is possible using only queue occupancy for congestion sensing.

High-radix networks reduce the diameter of the network but require longer cables compared to low-radix networks. Advances in signaling technology and the recent development of active optical cables facilitate implementation of high-radix topologies with longer cables.

An interconnection network is embedded in a packaging hierarchy. At the lowest level, the routers are connected via circuit boards, which are then connected via a backplane or midplane. One or more backplanes are packaged in a cabinet, with multiple cabinets connected by electrical or optical cables to form a complete system. The global (inter-cabinet) cables and their associated transceivers often dominate the cost of a network. To minimize the network cost, the topology should be matched to the characteristics of the available interconnect technologies, such as cost and performance.

The maximum bandwidth of an electrical cable drops with increasing cable length because signal attenuation due to skin effect and dielectric absorption increases linearly with distance. For typical high-performance signaling rates (10-20 Gb/s) and technology parameters, electrical signaling paths are limited to about 1 m in circuit boards and 10 m in cables. At longer distances, either the signaling rate must be reduced or repeaters inserted to overcome attenuation.

Historically, the high cost of optical signaling limited its use to very long distances or applications that demanded performance regardless of cost. Recent advances in silicon photonics and their application to active optical cables such as Intel Connects Cables and Luxtera Blazar have provided designers with economical optical interconnects. These active optical cables have electrical connections at either end and electrooptical and optoelectrical modules integrated into the cable itself.

Although optical cables have a higher fixed cost, their ability to transmit data over long distances at several times the data rate of copper cables results in a lower cost per unit distance than electrical cables. Based on the data available using current technologies, the break-even point is at 10 m. For distances shorter than 10 m, electrical signaling is less expensive. Beyond 10 m, optical signaling is more economical. The Dragonfly topology proposed here exploits this relationship between cost and distance. By reducing the number of global cables, it minimizes the effect of the higher fixed overhead of optical signaling, and by making the global cables longer, it maximizes the advantage of the lower per-unit cost of optical fibers.

To show an example Dragonfly network topology, the following symbols are used in the description of the dragonfly topology and in example routing algorithms presented later:

N Number of network terminals
p Number of terminals connected to each router a Number of routers in each group
k Radix of the routers
k_ Effective radix of the group (or the virtual router)
h Number of channels within each router used to connect to other groups
g Number of groups in the system
q Queue depth of an output port
qvc Queue depth of an individual output VC
H Hop count
Out$i$ Router output port i The Dragonfly topology is a hierarchical network with three levels, as shown in FIG. 1: routers (104, 105, and 106), groups (101, 102, and 103), and system. At the router level, each router has connections to p nodes, a−1 local channels—to other routers in the same group—and h global channels—to routers in other groups. Therefore the radix (or degree) of each router is defined as k=p+a+h−1. A group consists of a routers connected via an intra-group interconnection network formed from local channels, as shown at 101 in FIG. 1. Each group has ap connections to terminals and ah connections to global channels, and all of the routers in a group collectively act as a virtual router with radix k'=a(p+h). This very high radix, k'>>k enables the system level network to be realized with very low global diameter (the maximum number of expensive global channels on the minimum path between any two nodes). Up to g=ah+1 groups (N=ap(ah+1) terminals) can be connected with a global diameter of one. In contrast, a system-level network built directly with radix k routers would require a larger global diameter.

In a maximum-size (N=ap(ah+1)) dragonfly, there is exactly one connection between each pair of groups. In smaller dragonflies, there are more global connections out of each group than there are other groups. These extra global connections are distributed over the groups with each pair of groups connected by at least _ah+1 g_channels.

The dragonfly parameters a, p, and h can have any values. However, to balance channel load, the network in this example has a=2p=2h. Because each packet traverses two local channels along its route (one at each end of the global channel) for one global channel and one terminal channel, this ratio maintains balance. Because global channels are expensive, deviations from this 2:1 ratio are done in some embodiments in a manner that overprovisions local and terminal channels, so that the expensive global channels remain fully utilized. That is, the network is balanced in such examples so that a≥2h, 2p≥2h.

Figure 2:
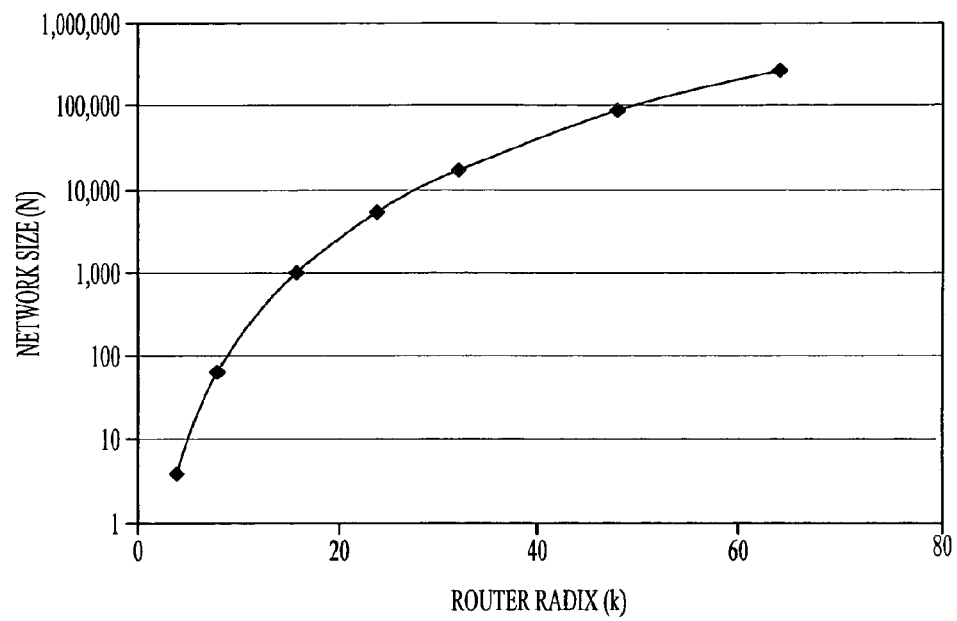
FIG. 2 is a graph illustrating scalability of a dragonfly network in nodes for various router radices, consistent with an example embodiment of the invention.
Figure 3:
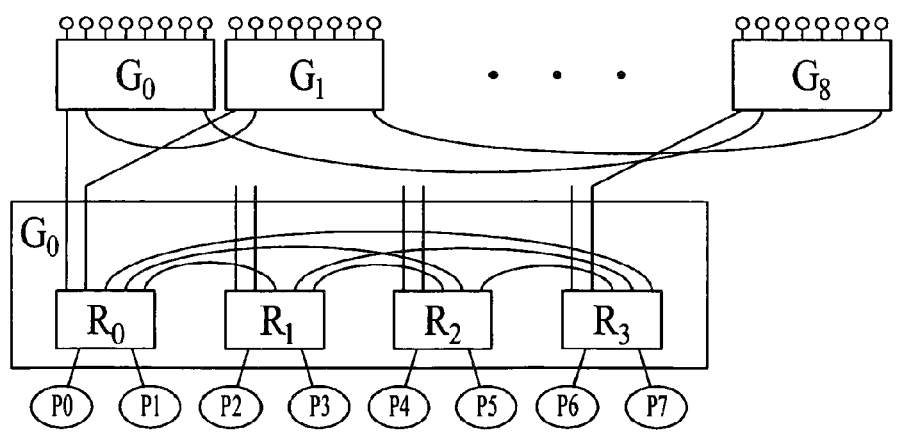
FIG. 3 is a block diagram illustrating a dragonfly network topology, consistent with an example embodiment of the invention.

The scalability of a balanced dragonfly is shown in FIG. 2. By increasing the effective radix, the dragonfly topology is highly scalable—with radix-64 routers, the topology scales to over 256 k nodes with a network diameter of only three hops. Arbitrary networks can be used for the intra-group and inter-group networks in FIG. 1. In the example presented here, we use a 1-D flattened butterfly or a completely-connected topology for both networks. A simple example of the dragonfly is shown in FIG. 3 with p=h=2 (two processing nodes per router and two channels within each router coupled to other groups), a=4 (four routers in each group) that scales to N=72 (72 nodes in the network) with k=7 (radix 7) routers. By using virtual routers, the effective radix is increased from k=7 to k'=16, as group $G_0$ of FIG. 3 has eight global connections and eight node connections.

Figure 4:
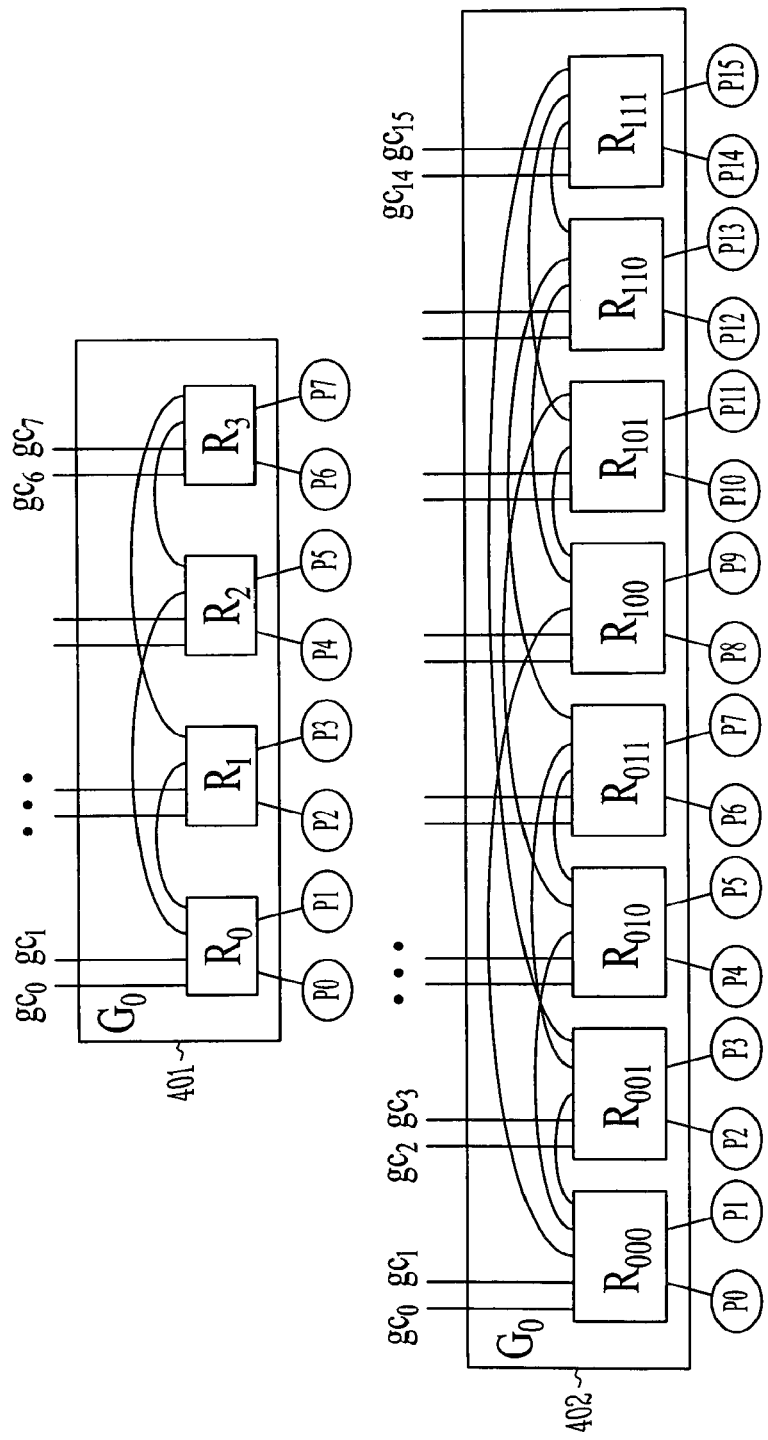
FIG. 4 is block diagram of dragonfly network topology groups, consistent with some example embodiments of the invention.

The global radix, k', can be increased further by using a higher-dimensional topology for the intra-group network. Such a network may also exploit intra-group packaging locality. For example, a 2-D flattened butterfly is shown in FIG. 4 at 401, which has the same k' as the group shown in FIG. 5 but exploits packaging locality by providing more bandwidth to local routers. A 3-dimension flattened butterfly is used in FIG. 4 at 402 to increase the effective radix from k'=16 to K'=32—allowing the topology to scale up to N=1056 using the same k=7 router as in FIG. 1.

To increase the terminal bandwidth of a high-radix network such as a dragonfly, channel slicing can be employed. Rather than make the channels wider, which would decrease the router radix, multiple network can be connected in parallel to add capacity. Similarly, the dragonfly topology in some embodiments can also utilize parallel networks to add capacity to the network. In addition, the dragonfly networks described so far assumed uniform bandwidth to all nodes in the network. However, if such uniform bandwidth is not needed, bandwidth tapering can be implemented by removing inter-group channels among some of the groups.

A variety of minimal and non-minimal routing algorithms can be implemented using the dragonfly topology. Some embodiments of global adaptive routing using local information lead to limited throughput and very high latency at intermediate loads. To overcome these problems, we introduce new mechanisms to global adaptive routing, which provide performance that approaches an ideal implementation of global adaptive routing.

Minimal routing in a dragonfly from source node s attached to router Rs in group Gs to destination node d attached to router Rd in group Gd traverses a single global channel and is accomplished in three steps:

Step 1: If Gs_=Gd and Rs does not have a connection to Gd, route within Gs from Rs to Ra, a router that has a global channel to Gd.

Step 2: If Gs_=Gd, traverse the global channel from Ra to reach router Rb in Gd.

Step 3: If Rb_=Rd, route within Gd from Rb to Rd.

This minimal routing works well for load-balanced traffic, but results in poor performance on adversarial traffic patterns. To load-balance adversarial traffic patterns, Valiant's algorithm can be applied at the system level—routing each packet first to a randomly-selected intermediate group Gi and then to its final destination d. Applying Valiant's algorithm to groups suffices to balance load on both the global and local channels. This randomized non-minimal routing traverses at most two global channels and requires five steps:

Step 1: If Gs_=Gi and Rs does not have a connection to Gi, route within Gs from Rs to Ra, a router that has a global channel to Gi.

Step 2: If Gs_=Gi traverse the global channel from Ra to reach router Rx in Gi.

Step 3: If Gi_=Gd and Rx does not have a connection to Gd, route within Gi from Rx to Ry, a router that has a global channel to Gd.

Step 4: If Gi_=Gd, traverse the global channel from Ry to router Rb in Gd.

Step 5: If Rb_=Rd, route within Gd from Rb to Rd.

Figure 5:
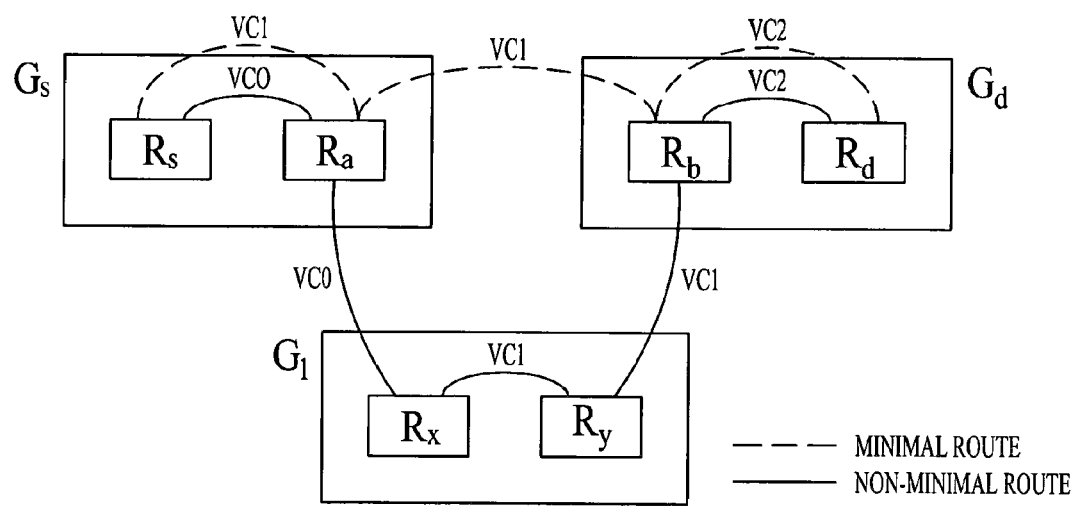
FIG. 5 is a block diagram of a dragonfly network illustrating minimal and non-minimal routing using virtual channels, consistent with an example embodiment of the invention.

To prevent routing deadlock, two virtual channels (VCs) are needed for minimal routing and three VCs are required for non-minimal routing, as shown in FIG. 5. These virtual router assignments eliminate all channel dependencies due to routing. For some applications, additional virtual channels may be required to avoid protocol deadlock—e.g., for shared memory systems, separate sets of virtual channels may be required for request and reply messages.

A variety of routing algorithms for the dragonfly topology have been evaluated, including:

Minimal (MIN): The minimal path is taken as described previously.

Valiant (VAL) [32]: Randomized non-minimal routing as described previously.

Universal Globally-Adaptive Load-balanced [29] (UGALG,UGAL-L) UGAL chooses between MIN and VAL on a packet-by-packet basis to load-balance the network. The choice is made by using queue length and hop count to estimate network delay and choosing the path with minimum delay. We implement two versions of UGAL.

UGAL-L—uses local queue information at the current router node.

UGAL-G—uses queue information for all the global channels in Gs—assuming knowledge of queue lengths on other routers. While difficult to implement, this represents an ideal implementation of UGAL since the load-balancing is required of the global channels, not the local channels.

Cycle accurate simulations are used to evaluate the performance of the different routing algorithms. We simulate a single-cycle, input-queued router switch but provide sufficient speedup in order to generalize the results and ensure that routers do not become the bottleneck of the network. Packets are injected using a Bernoulli process. The simulator is warmed up under load without taking measurements until steady-state is reached. Then a sample of injected packets is labeled during a measurement interval. The simulation is run until all labeled packets exit the system. Unless otherwise noted, the simulation results are shown for dragonfly of size 1K node using p=h=4 and a=8 parameters. Simulations of other size networks follow the same trend and are not presented due to space constraints. Single flit (flow control unit) packets are used to separate the routing algorithm from flow control issues such as the use of wormhole or virtual cut-through flow control. The input buffers are initially assumed to be 16 flits deep. The impact of different buffer sizes is also evaluated.

Figure 6:
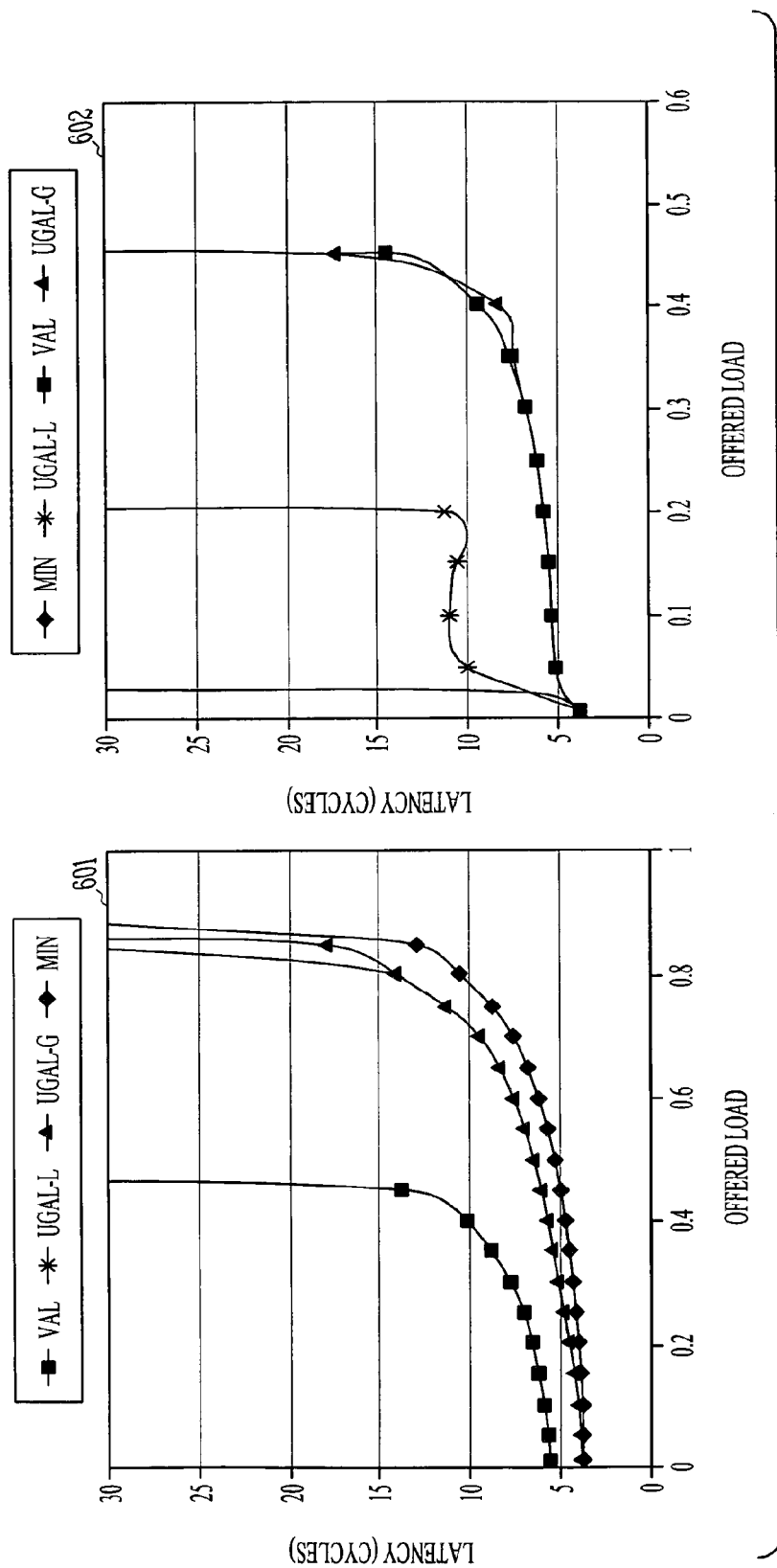
FIG. 6 is a graph illustrating latency v. offered load for a variety of routing algorithms using various traffic patterns, consistent with an example embodiment of the invention.

The different routing algorithms are evaluated using both benign and adversarial synthetic traffic patterns, as shown in FIG. 6. Latency v. offered load is shown for the four routing algorithms, using both uniform random traffic at 601 and adversarial traffic at 602. The use of a synthetic traffic pattern allows us to stress the topology and routing algorithm to fully evaluate the network. For benign traffic such as uniform random (UR), MIN is sufficient to provide low latency and high throughput, as shown at 601 of FIG. 6. VAL achieves approximately half of the network capacity because its load-balancing doubles the load on the global channels. Both UGAL-G and UGAL-L approach the throughput of MIN, but with slightly higher latency near saturation. The higher latency is caused by the use of parallel or greedy allocation where the routing decision at each port is made in parallel. The use of sequential allocation will reduce the latency at the expense of a more complex allocator.

To test the load-balancing ability of a routing algorithm, we use a worst-case (WC) traffic pattern where each node in group Gi sends traffic to a randomly selected node in group Gi+1. With minimal routing, this pattern will cause all nodes in each group Gi to send all of their traffic across the single global channel to group Gi+1. Non-minimal routing is required to load balance this traffic pattern by spreading the bulk of the traffic across the other global channels.

The evaluation for this WC traffic is shown in FIG. 6 at 602. Because MIN forwards all of the traffic from each group across a single channel, its throughput is limited to 1/ah. VAL achieves slightly under 50% throughput which is the maximum possible throughput with this traffic. UGAL-G achieves similar throughput as VAL but UGAL-L leads to both limited throughput as well as high average packet latency at intermediate load. In the following section, we show how the indirect nature of adaptive routing on the dragonfly leads to performance degradation. We identify the issues with UGAL-L and present mechanisms that can overcome these problems.

Adaptive routing on the dragonfly is challenging because it is the global channels, the group outputs, that need to be balanced, not the router outputs. This leads to an indirect routing problem. Each router must pick a global channel to use using only local information that depends only indirectly on the state of the global channels. Previous global adaptive routing methods used local queue information, source queues and output queues, to generate accurate estimates of network congestion. In these cases, the local queues were an accurate proxy of global congestion, because they directly indicated congestion on the routes they initiated. With the dragonfly topology, however, local queues only sense congestion on a global channel via backpressure over the local channels. If the local channels are overprovisioned, significant numbers of packets must be enqueued on the overloaded minimal route before the source router will sense the congestion. This results in a degradation in throughput and latency as shown earlier in FIG. 6 at 602.

A throughput issue with UGAL-L arises due to a single local channel handling both minimal and non-minimal traffic. For example, in FIG. 7, a packet in R1 has a minimal path which uses gc7 and a nonminimal path which uses gc6. Both paths share the same local channel from R1 to R2. Because both paths share the same local queue (and hence have the same queue occupancy) and the minimal path is shorter (one global hop vs two), the minimal channel will always be selected, even when it is saturated. This leads to the minimal global channel being overloaded and the non-minimal global channels that share the same router as the minimal channel being under utilized. With UGAL-G, the minimal channel is preferred and the load is uniformly balanced across all other global channels. With UGAL-L, on the other hand, the non-minimal channels on the router that contains the minimal global channel are under utilized—resulting in a degradation of network throughput.

To overcome this limitation, we modify the UGAL algorithm to separate the queue occupancy into minimal and nonminimal components by using individual VCs (UGAL-LVC).

```
if   (qm vcHm ≤ qnm vcHnm )
        route minimally;
else
        route nonminimally;
``` where the subscript m and nm denote the minimal and nonminimal paths. If the VC assignment of FIG. 5 is used, qm vc=q(V C1) and qnm vc=q(V C0).

When compared, UGAL-LVC matches the throughput of UGAL-G on a WC traffic pattern but for UR traffic, the throughput is limited, with approximately 30% reduction in throughput. For the WC traffic, where most of the traffic needs to be sent non-minimally, UGALLVC performs well since the minimal queue is heavily loaded. However, for load-balanced traffic when most traffic should be sent minimally, individual VCs do not provide an accurate representation of the channel congestion—resulting in throughput degradation.

To overcome this limitation, we further modify the UGAL algorithm to separate the queue occupancy into minimal and non-minimal components only when the minimal and non-minimal paths start with the same output port. Our hybrid modified UGAL routing algorithm (UGAL-LVC H) is:

```
if   (qmHm ≤ qnmHnm && Outm_= Outnm ) | | (qm vcHm ≤ qnm
vcHnm && Outm = Outnm)
       route minimally;
else
       route nonminimally;
```

Compared to UGAL-LVC, UGAL-LVC H provides the same throughput on WC traffic pattern but matches the throughput of UGAL-G on UR traffic but resulting in nearly 2× higher latency at an offered load of 0.8, near saturation. For WC traffic, UGAL-LVC H also results in higher intermediate latency compared to UGAL-G.

The high intermediate latency of UGAL-L is due to minimally-routed packets having to fill the channel buffers between the source and the point of congestion before congestion is sensed. Our research shows that non-minimally routed packets have a latency curve comparable to UGAL-G while minimally-routed packets see significantly higher latency. As input buffers are increased, the latency of minimally-routed packets increases and is proportional to the depth of the buffers. A histogram of latency distribution shows two clear distributions—one large distribution with low latency for the non-minimal packets and another distribution with a limited number of packets but with much higher latency for the minimal packets.

Figure 7:
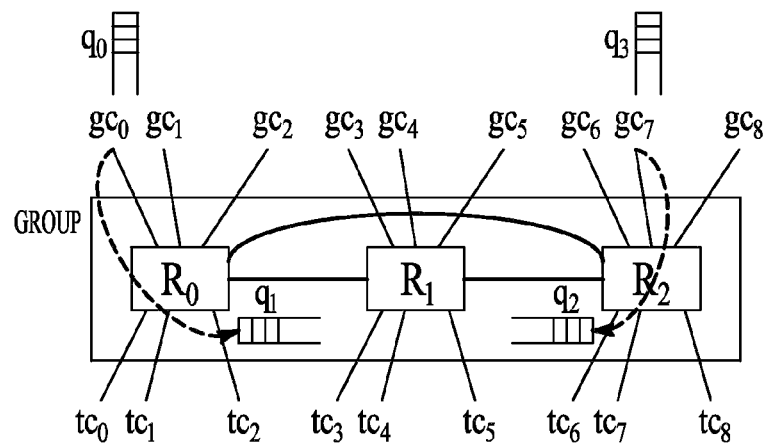
FIG. 7 is a node group diagram of a dragonfly topology network illustrating adaptive routing via global channels using backpressure from intermediate nodes, consistent with an example embodiment of the invention.

To understand this problem with UGAL-L, in the example dragonfly group shown in FIG. 7, assume a packet in R1 is making its global adaptive routing decision of routing either minimally through gc0 or non-minimally through gc7. The routing decision needs to load balance global channel utilization and ideally, the channel utilization can be obtained from the queues associated with the global channels, q0 and q3. However, q0 and q3 queue informations are only available at R0 and R2 and not readily available at R1—thus, the routing decision can only be made indirectly through the local queue information available at R1.

In this example, q1 reflects the state of q0 and q2 reflects the state of q3. When either q0 or q3 is full, the flow control provides backpressure to q1 and q2 as shown with the arrows in FIG. 7. As a result, in steady-state measurement, these local queue information can be used to accurately measure the throughput. Since the throughput is defined as the offered load when the latency goes to infinity (or the queue occupancy goes to infinity), this local queue information is sufficient. However, q0 needs to be completely full in order for q1 to reflect the congestion of gc0 and allow R1 to route packets non-minimally. Thus, using local information requires sacrificing some packets to properly determine the congestion—resulting in packets being sent minimally having much higher latency. As the load increases, although minimally routed packets continue to increase in latency, more packets are sent non-minimally and results in a decrease in average latency until saturation.

In order for local queues to provide a good estimate of global congestion, the global queues need to be completely full and provide a stiff backpressure towards the local queues. The stiffness of the backpressure is inversely proportional to the depth of the buffer—with deeper buffers, it takes longer for the backpressure to propagate while with shallower buffers, a much stiffer backpressure is provided. As the buffer size decreases, the latency at intermediate load is decreased because of the stiffer backpressure. However, using smaller buffers comes at the cost of reduced network throughput.

To overcome the high intermediate latency, we propose using credit round-trip latency to sense congestion faster and reduce latency. In credit-based flow control, illustrated in FIGS. 8A-8B, credit counts are maintained for buffers downstream. As packets are sent downstream, the appropriate credit count is decremented and once the packet leaves downstream router, credits are sent back upstream and the credit count is incremented. The latency for the credits to return is referred to as credit round-trip latency (tcrt) and if there is congestion downstream, the packet cannot be immediately processed and results in an increase in tcrt.

Figure 8A:
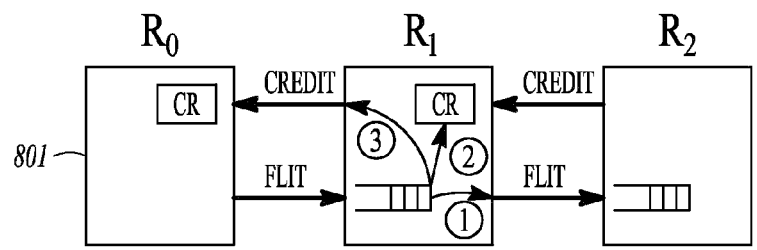
FIGS. 8A-8B are node diagrams illustrating credit round trip latency tracking, consistent with an example embodiment of the invention.
Figure 8B:
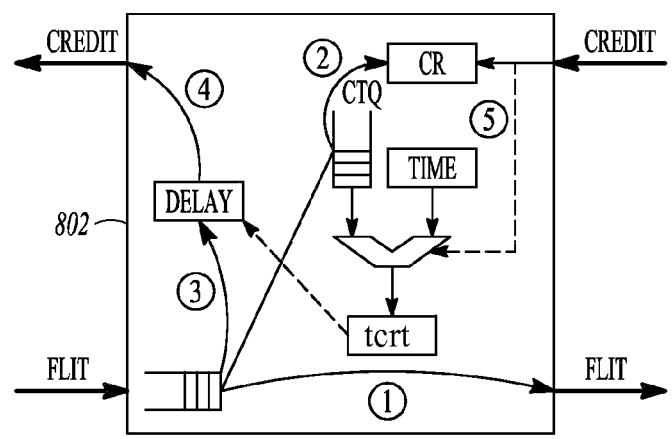

Referring to FIG. 8A, conventional credit flow control is illustrated at 801. As packets are sent downstream (1), the output credit count is decremented (2) and credits are sent back upstream (3). This scheme is modified as shown in FIG. 8B at 802 to use credit round trip latency to estimate congestion in the network. In addition to the output credit count being decremented (2), the time stamp is pushed into the credit time queue, denoted CTQ. Before sending the credit back upstream (4), the credit is delayed (3), and when downstream credits are received (5), the credit count is updated as well as the credit round trip latency tcrt.

The value of tcrt can be used to estimate the congestion of global channels. By using this information to delay upstream credits, we stiffen the backpressure and more rapidly propagate congestion information up stream. For each output O, tcrt(O) is measured and the quantity td(O) =tcrt(O)−tcrt0 is stored in a register. Then, when a flit is sent to output O, instead of immediately sending a credit back upstream, the credit is delayed by td(O)−min [td(o)]. The credits sent across the global channels are not delayed. This ensures that there is no cyclic loop in this mechanism and allows the global channels to be fully utilized.

The delay of returning credits provides the appearance of shallower buffers to create a stiff backpressure. However, to ensure that the entire buffer gets utilized and there is no reduced throughput at high load, the credits needs to delayed by the variance of td across all outputs. We estimate the variance by finding min [td(o)] value and using the difference. By delaying credits, the upstream routers observes congestion at a faster rate (compared to waiting for the queues to fill up) and leads to better global adaptive routing decisions.

The UGAL-L routing algorithm evaluation using credit latency (UGAL-LCR) is investigated for both WC and UR traffic using buffers of depth 16 and 256. UGAL-LCR leads to significant reduction in latency compared to UGALL and approaches the latency of UGAL-G. For WC traffic, UGAL-LCR reduces latency by up to 35% with 16 buffers and up to over 20× reduction in intermediate latency with 256 buffers compared to UGAL-L. Unlike UGAL-L, the intermediate latency with UGAL-LCR is independent of buffer size. For UR traffic, UGAL-LCR provides up to 50% latency reduction near saturation compared to UGAL-LVC H. However, both UGAL-LCR and UGALL VC H fall short of the throughput of UGAL-G with UR traffic because their imprecise local information results in some packets being routed non-minimally.

The implementation of this scheme results in minimal complexity overhead as the following three features are needed at each router:
  tracking credits individually to measure tcrt
  registers to store td values
  a delay mechanism in returning credits The amount of storage required for td is minimal as only O(k) registers are required. The credits are often returned by piggybacking on data flits and delaying credits to wait for the transmission of the next data flit upstream is required. The proposed mechanism only requires adding additional delay.

As for tracking individual credits, credits are conventionally tracked as a pool of credits in credit flow control—i.e., a single credit counter is maintained for each output VC and increments when a credit is received. The implementation of UGAL-LCR requires tracking each credit individually. This can be done by pushing a timestamp on the tail of a queue each time a flit is sent, as shown in FIG. 17(b) with the use of a credit timestamp queue (CTQ), and popping the timestamp off the head of the queue when the corresponding credit arrives. Because flits and credits are 1:1 and maintain ordering, the simple queue suffices to measure round-trip credit latency. The depth of the queue needs to be proportional to the depth of the data buffers but the queue size can be reduced to utilize imprecise information to measure congestion—e.g., by having a queue which is only ¼ of the data buffer size, only one of four credits are tracked to measure the congestion.

The cost of a dragonfly topology also compares favorably to a flattened butterfly, as well as to other topologies. The flattened butterfly topology reduces network cost of a butterfly by removing intermediate routers and channels. As a result, the flattened butterfly reduces cost by approximately 50% compared to a folded-Clos on balanced traffic. The dragonfly topology extends the flattened butterfly by increasing the effective radix of the routers to further reduce the cost and increase the scalability of the network.

A comparison of dragonfly and flattened butterfly networks of 64 k nodes shows that a flattened butterfly uses 50% of the router ports for global channels, while a dragonfly uses 25% of the ports for global connections. The flattened butterfly requires two additional dimensions, while the dragonfly is a single dimension. In addition, the dragonfly provides better scalability because the group size can be increased to scale the network whereas scaling the flattened butterfly requires adding additional dimensions. With the hop count nearly identical, the dragonfly trades off longer global cables for smaller number of global cables required to provide a more cost-efficient topology better matched to emerging signaling technologies.

The dollar cost of a dragonfly also compares favorably to a flattened butterfly for networks larger than 1 k nodes, showing approximately a 10% savings for up to 4 k nodes, and approximately a 20% cost savings relative to flattened butterfly topologies for more than 4 k nodes as the dragonfly has fewer long, global cables. Folded Clos and 3-d torus networks suffer in comparison, because of the larger number of cables needed to support high network diameters. For a network of only 1 k nodes, the dragonfly is 62% the cost of a 3-d torus network and 50% that of a folded Clos network. This reduction in network cost is directly correlated to a reduction in network power consumed, which is a significant advantage for large networks as well as for installations that are desirably environmentally friendly.

The example embodiments of a dragonfly network presented here show how use of a group of routers as a virtual router can increase the effective radix of a network, and hence reduce network diameter, cost, and latency. Because the dragonfly topology reduces the number global cables in a network, while at the same time increasing their length, the dragonfly topology is particularly well suited for implementations using emerging active optical cables—which have a high fixed cost but a low cost per unit length compared to electrical cables. Using active optical cables for the global channels, a dragonfly network reduces cost by 20% compared to a flattened butterfly and by 52% compared to a folded Clos network of the same bandwidth.

Various embodiments of dragonfly networks described here also comprise two new variants of global adaptive routing that overcome the challenge of indirect adaptive routing presented by the dragonfly. A dragonfly router will typically make a routing decision based on the state of a global channel attached to a different router in the same group. Conventional global adaptive routing algorithms that use local queue occupancies to infer the state of this remote channel give degraded throughput and latency. We introduce the selective use of virtual channel discrimination to overcome the bandwidth degradation. We also introduce the use of credit round-trip latency to both sense and signal channel congestion. The combination of these two techniques gives a global adaptive routing algorithm that approaches the performance of an ideal algorithm with perfect knowledge of remote channel state.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the example embodiments of the invention described herein. It is intended that this invention be limited only by the claims, and the full scope of equivalents thereof.

The invention claimed is:

1. An apparatus comprising:
  a routing device to support adaptive routing of data in a multiprocessor network comprising a Dragonfly network topology, wherein the routing of the data is to be based on one or more routing tables, the Dragonfly network topology is to comprise a plurality of groups, one or more of the groups is to comprise a respective plurality of routers and is to couple by respective global channels to the other groups in the plurality of groups, and a respective one of the routers is to connect to one or more processor nodes in the network,
  wherein the number of processor nodes per router in the Dragonfly network topology is greater than the number of global channels per router.

2. The apparatus of claim 1, wherein the apparatus is a switch or a router and the routing device is a chip.

3. The apparatus of claim 1, wherein at least one of the plurality of groups is to function as a virtual router in the network.

4. The apparatus of claim 3, wherein each of the plurality of groups is to function as a respective virtual router in the network.

5. The apparatus of claim 1, wherein the routing device is to further monitor congestion associated with at least one channel in the network.

6. The apparatus of claim 5, wherein adaptive routing decisions are to be based at least in part on the congestion monitoring.

7. The apparatus of claim 6, wherein the routing device is to route data using credit round-trip latency as an indicator of channel congestion.

8. The apparatus of claim 6, wherein the channel comprises a global channel.

9. The apparatus of claim 1, wherein the Dragonfly network topology comprises at least one virtual channel.

10. The apparatus of claim 1, wherein the network interconnects at least two sub-networks.

11. The apparatus of claim 1, wherein the effective radix of each group is the product of the number of routers in each group times the sum of the number of processor nodes connected to each router plus the number of global channels in the network.

12. The apparatus of claim 1, wherein the number of routers per group is equal to twice the number of processor nodes per router, and the number of processor nodes per router is equal to the number of channels per router connected to other groups.

13. The apparatus of claim 1, wherein the network comprises a number of processor nodes and the virtual router has a radix of approximately 2 times the square root of the number of processor nodes.

14. The apparatus of claim 1, wherein the plurality of routers in at least one of the groups is greater than twice the number of global channels per router.

15. The apparatus of claim 1, wherein the group comprises a sub-network having a flattened butterfly network topology.

16. The apparatus of claim 1, wherein the routing device is to route data using selective virtual channel discrimination.

17. The apparatus of claim 1, wherein the one or more tables comprises at least one global table for routing the data between groups of the plurality of groups.

18. The apparatus of claim 1, wherein the one or more tables comprises at least one local table used for routing the data within a group of the plurality of groups.

19. A method comprising:
detecting congestion of at least one channel in a multiprocessor network comprising a Dragonfly network topology;
performing adaptive routing of data within the network based on the congestion; and
using one or more routing tables corresponding to the Dragonfly network,
wherein the Dragonfly network topology comprises a plurality of groups, each respective group in the plurality of groups comprises a plurality of routers and is coupled by respective global channels to the other groups in the plurality of groups, and respective of the routers are connected to one or more processor nodes in the network,
wherein the number of processor nodes per router in the Dragonfly network topology is greater than the number of global channels per router.

20. A system comprising:
a plurality of processor nodes; and
a plurality of router devices, wherein each router is coupled to a respective subset of the plurality of processor nodes, each router is included in a respective one of a plurality of router groups, each group has a respective group topology and is connected via a respective global channel to each other group in the plurality of router groups, at least one of the routers is to perform routing within the system using adaptive routing, and the routing is to be performed based at least in part on one or more routing tables,
wherein the number of processor nodes per router in the Dragonfly network topology is greater than the number of global channels per router.

21. The system of claim 20, wherein each of the plurality of router groups is to function as a virtual router in the network.

22. The system of claim 20, further comprising one or more local channels to interconnect routers within a respective router group.

23. The system of claim 22, wherein the adaptive routing is based on congestion determined for the at least one global channel.

24. The system of claim 23, wherein the congestion of the global channel is determined from congestion detected at a local channel.

25. The system of claim 20, wherein the plurality of processor nodes comprises at least one hundred thousand processor nodes.

26. The system of claim 20, wherein each of the router groups comprises a sub-network with a respective topology.

27. The system of claim 26, wherein the topology of at least one of the router groups comprises a flattened butterfly topology.

28. The system of claim 20, wherein the one or more tables comprises at least one global table for routing the data between groups of the plurality of groups.

29. The system of claim 20, wherein the one or more tables comprises at least one local table used for routing the data within a group of the plurality of groups.

* * * * *